(12) United States Patent
Quan et al.

(10) Patent No.: US 9,723,587 B2
(45) Date of Patent: Aug. 1, 2017

(54) MOVEMENT INFORMATION PROCESSING METHOD AND SYSTEM, USER EQUIPMENT, AND ACCESS NETWORK DEVICE

(71) Applicant: Huawei Technologies Co., Ltd., Shenzhen (CN)

(72) Inventors: Wei Quan, Beijing (CN); Yuhua Chen, Shenzhen (CN); Yi Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/511,341

(22) Filed: Oct. 10, 2014

(65) Prior Publication Data
US 2015/0024758 A1 Jan. 22, 2015

Related U.S. Application Data

(63) Continuation of application No. PCT/CN2012/073924, filed on Apr. 12, 2012.

(51) Int. Cl.
*H04W 36/00* (2009.01)
*H04W 64/00* (2009.01)
(Continued)

(52) U.S. Cl.
CPC ..... *H04W 64/003* (2013.01); *H04W 36/0055* (2013.01); *H04W 64/006* (2013.01); *H04W 36/32* (2013.01); *H04W 88/06* (2013.01)

(58) Field of Classification Search
None
See application file for complete search history.

(56) References Cited

U.S. PATENT DOCUMENTS 5,913,168 A   6/1999 Moreau et al.
2011/0296125 A1* 12/2011 Shaikh ................ G06F 21/30
                                                     711/159
(Continued)

FOREIGN PATENT DOCUMENTS

CN   1494340 A    5/2004
CN   101052204 A  10/2007
(Continued)

OTHER PUBLICATIONS

Alcatel-Lucent, et al., "UE speed-based methods and mobility state estimation for improving the mobility performance in HetNets," 3GPP TSG-RAN WG2 meeting #77 bis, R2-121707, 7.10.4, Mar. 26-30, 2012, 8 pages.
(Continued)

*Primary Examiner* — Adolf Dsouza
(74) *Attorney, Agent, or Firm* — Slater Matsil, LLP

(57) ABSTRACT

Embodiments of the present invention provide a movement information processing method and system, a user equipment, and an access network device. In one embodiment, a UE measures a characteristic parameter of a cell to be measured, and then obtains movement information of the UE according to a change of the characteristic parameter within a predetermined time. In this way, the UE can send the movement information to an access network device and the access network device executes a movement-related operation according to the movement information.

20 Claims, 4 Drawing Sheets

(51) Int. Cl.
*H04W 88/06* (2009.01)
*H04W 36/32* (2009.01)

(56) References Cited

U.S. PATENT DOCUMENTS

2012/0054841 A1* 3/2012 Schultz ................ G06F 21/44
726/6
2013/0030931 A1* 1/2013 Moshfeghi ............. G01S 19/48
705/16

FOREIGN PATENT DOCUMENTS

CN 101442786 A 5/2009
DE 19624113 A1 12/1996

OTHER PUBLICATIONS

Ericsson, "Offline discussions on MRO Enhancements for Release 11," 3GPP TSG-RAN WG3 #75, R3-120309, 11.1, Feb. 5-10, 2012, 14 pages.
Nokia Siemens Networks, "Avoiding unnecessary handovers in inter-RAT environment," 3GPP TSG-RAN WG3 Meeting #70, R3-103552, 16.1.4, Nov. 15-19, 2010, 4 pages.

* cited by examiner

MOVEMENT INFORMATION PROCESSING METHOD AND SYSTEM, USER EQUIPMENT, AND ACCESS NETWORK DEVICE

This application is a continuation of International Application No. PCT/CN2012/073924, filed on Apr. 12, 2012, which is hereby incorporated by reference in its entirety.

TECHNICAL FIELD

The present invention relates to communications technologies and, in particular embodiments, to movement information processing method and system, a user equipment, and an access network device.

BACKGROUND

In a wireless communication system such as a long term evolution (LTE for short) system, when a user equipment (UE for short) moves, the UE can report location information to an evolved base station (eNB for short), so as to implement that the eNB performs UE speed estimation according to the location information, thereby enabling the eNB to execute a movement-related operation according to a speed estimation result. For example, a state (that is, an idle state or a connected state) of the UE is decided in combination with whether there is data being transmitted on the UE, or a measurement parameter is configured for the UE in combination with network topology information.

However, the UE speed estimation based on the location information reported by the UE causes a signaling overhead to increase.

SUMMARY

Embodiments of the present invention provide a movement information processing method and system, a user equipment, and an access network device, so as to reduce a signaling overhead.

In one aspect, a movement information processing method is provided. A user equipment measures a characteristic parameter of a cell to be measured. The user equipment obtains movement information of the user equipment according to a change of the characteristic parameter within a predetermined time. The user equipment sends the movement information to an access network device, so that the access network device executes a movement-related operation according to the movement information.

In another aspect, a movement information processing method is provided. An access network device receives movement information of a user equipment sent by the user equipment. The movement information is obtained by the user equipment through measuring a characteristic parameter of a cell to be measured and according to a change of the characteristic parameter within a predetermined time. The access network device executes a movement-related operation according to the movement information.

In another aspect, a user equipment is provided. A measuring unit is configured to measure a characteristic parameter of a cell to be measured. An obtaining unit is configured to obtain movement information of the user equipment according to a change of the characteristic parameter within a predetermined time. A sending unit is configured to send the movement information to an access network device, so that the access network device executes a movement-related operation according to the movement information.

In another aspect, an access network device is provided. A receiving unit is configured to receive movement information of a user equipment sent by the user equipment. The movement information is obtained by the user equipment through measuring a characteristic parameter of a cell to be measured and according to a change of the characteristic parameter within a predetermined time. An executing unit is configured to execute a movement-related operation according to the movement information.

In another aspect, a movement information processing system is provided and includes the foregoing user equipment and the foregoing access network device.

It can be seen from the foregoing technical solutions that, in the embodiments of the present invention, a UE measures a characteristic parameter of a cell to be measured, and obtains movement information of the UE according to a change of the characteristic parameter within a predetermined time, so that the UE can send the movement information to an access network device and the access network device executes a movement-related operation according to the movement information. Embodiments can solve a problem of an increase of a signaling overhead caused by UE speed estimation based on location information reported by a UE in the prior art, so as to further reduce the signaling overhead.

BRIEF DESCRIPTION OF THE DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and persons of ordinary skill in the art may still derive other drawings according to these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

The technical solutions of the present invention may be applied to various wireless communication systems, such as a global system for mobile communications (GSM for short), a general packet radio service (GPRS for short) system, a code division multiple access (CDMA for short) system, a CDMA2000 system, a wideband code division multiple access (WCDMA for short) system, a long term evolution (LTE for short) system or a world interoperability for microwave access (WiMAX for short) system.

An access network device may be a network element such as a base station controller (BSC for short) in a GSM system, GPRS system or CDMA system, a radio network controller (RNC for short) in a CDMA2000 system or WCDMA system, an evolved base station (Evolved NodeB, eNB for short) in an LTE system, or an access service network base station (ASN BS for short) in a WiMAX network.

Figure 1:
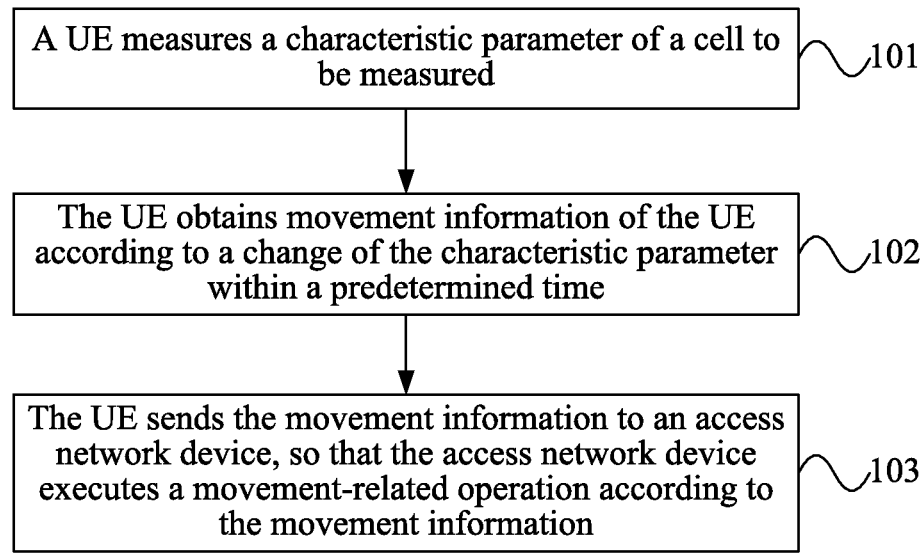
FIG. 1 is a schematic flow chart of a movement information processing method provided in an embodiment of the present invention.

FIG. 1 is a schematic flow chart of a movement information processing method provided in an embodiment of the present invention, and as shown in FIG. 1, the movement information processing method in this embodiment may include the following steps.

101. A UE measures a characteristic parameter of a cell to be measured.

The characteristic parameter to be measured may include, but is not limited to, at least one of the following: reference signal received power (RSRP for short), reference signal received quality (RSRQ for short), a signal to noise ratio (SNR for short), a signal to interference plus noise ratio (SINR for short), path loss, a location parameter (for example, global positioning system or GPS for short) information or an observed time difference of arrival (OTDOA for short), which is not limited by the embodiment), a Doppler shift (DS for short) of a downlink received signal, and a channel quality indication (CQI for short).

102. The UE obtains movement information of the UE according to a change of the characteristic parameter within a predetermined time.

In an optional implementation manner of this embodiment, the UE may specifically calculate the movement information of the UE according to a change amount of the characteristic parameter within a time T.

For example, the UE may calculate the movement information of the UE $$\Delta_{RSRP} = \frac{RSRP_{T2} - RSRP_{T1}}{T2 - T1}$$

according to a change amount of RSRP within [T1,T2] (where, T2=T1+T).

For another example, the UE may calculate the movement information of the UE $$\Delta_{SNR} = \frac{SNR_{T2} - SNR_{T1}}{T2 - T1}$$

according to a change amount of an SNR within [T1,T2] (where, T2=T1+T).

For another example, the UE may calculate the movement information of the UE $$\Delta_{SNR} = \frac{SINR_{T2} - SINR_{T1}}{T2 - T1}$$

according to a change amount of an SINR within [T1,T2] (where, T2=T1+T).

For another example, the UE may calculate the movement information of the UE $$\Delta_{PL} = \frac{PL_{T2} - PL_{T1}}{T2 - T1}$$

according to a change amount of path loss within [T1,T2] (where, T2=T1+T).

For another example, the UE may calculate the movement information of the UE $$\Delta_{OTDOA} = \frac{OTDOA_{T2} - OTDOA_{T1}}{T2 - T1}$$

according to a change amount of an OTDOA within [T1,T2] (where, T2=T1+T).

For another example, the UE may calculate the movement information of the UE $$\Delta_{DS} = \frac{DS_{T2} - DS_{T1}}{T2 - T1}$$

according to a change amount of a Doppler shift of a downlink received signal within [T1,T2] (where, T2=T1+T).

For another example, the UE may calculate the movement information of the UE $$\Delta_{CQI} = \frac{CQI_{T2} - CQI_{T1}}{T2 - T1}$$

according to a change amount of a CQI within [T1,T2] (where, T2=T1+T).

It should be noted that the movement information may be the change amount of the characteristic parameter, and the change amount of the characteristic parameter may also be mapped into movement information, for example, according to a mapping table which is of a change amount of a characteristic parameter and movement information and is obtained in advance.

103. The UE sends the movement information to an access network device, so that the access network device executes a movement-related operation according to the movement information.

Specifically, the access network device may decide a state (an idle state or a connected state) of the UE in combination with whether there is data being transmitted on the UE, or configure a measurement parameter for the UE in combination with network topology information, which is not limited by the embodiment.

In an optional implementation manner of this embodiment, before 101, the UE may further receive configuration information sent by the access network device. The configuration information includes at least one of the following: measurement period information of a measurement characteristic parameter, identity information of a cell to be measured, sending period information for sending movement information, a triggering condition for sending movement information, and a characteristic parameter to be measured.

It should be noted that the cell to be measured may include, but is not limited to, at least one of a service cell and a neighboring cell, which is not limited by the embodiment. The identity information of a cell to be measured may include, but is not limited to, frequency information or a cell identity (Cell ID for short) of the cell to be measured, which is not limited by the embodiment.

It should be noted that the triggering condition for sending movement information may include, but is not limited to, at least one of the following: a threshold of the characteristic parameter, a hysteresis time, a triggering event, and a threshold of the number of sending times, which is not limited by the embodiment.

For example, when a change of the characteristic parameter within a predetermined time reaches a configured threshold of the characteristic parameter (for example, greater than or equal to the threshold, or smaller than or equal to the threshold, or between two thresholds, which is not limited by the embodiment), the UE may trigger reporting of movement information, that is, the UE sends the movement information to the access network device.

For another example, when a change of the characteristic parameter within a predetermined time reaches a configured threshold of the characteristic parameter and a specific hysteresis time T is reached, the UE may trigger reporting of movement information, that is, the UE sends the movement information to the access network device.

For another example, when a change of the characteristic parameter within a predetermined time reaches a configured threshold N consecutive times, the UE may trigger reporting of movement information, that is, the UE sends the movement information to the access network device.

For another example, when the number of sending times reaches a configured threshold of the number of sending times, the UE may no longer trigger reporting of movement information, that is, the UE no longer sends the movement information to the access network device.

In an optional implementation manner of this embodiment, the UE may specifically receive configuration information sent, through a broadcast message or upper-layer signaling, by the access network device. Specifically, the configuration information sent through the broadcast message may control the UE in an idle state to perform 101 and 102, and control the UE to enter a connected state to perform 103; or control the UE in a connected state to perform 101 to 103. Specifically, the configuration information sent through the upper-layer signaling may control the UE in a connected state to perform 101 to 103; or control the UE in a connected state to enter an idle state to perform 101 and 102.

For example, for upper-layer signaling, specifically, the configuration information may be carried through an information element (IE for short) in a radio resource control (RRC for short) message, where the RRC message may be an RRC message in the prior art, for example, an RRC connection reconfiguration message, which is not limited by the embodiment. An IE of an existing RRC message is expanded to carry the configuration information, or the RRC message may also be different from any existing RRC message in the prior art.

For another example, for upper-layer signaling, specifically, the configuration information may also be carried through adding a new media access control (MAC for short) control element (CE for short) message.

In an optional implementation manner of this embodiment, the UE may also obtain the configuration information according to a preconfiguration, for example, a protocol agreement.

In an optional implementation manner of this embodiment, before 101 or 103, the UE may further receive query instruction information sent by the access network device, where the query instruction information is used to query movement information of the UE. Specifically, the UE may specifically receive the query instruction information sent, through upper-layer signaling, by the access network device.

For example, specifically, an IE in an RRC message may carry the query instruction information, where the RRC message may be an RRC message in the prior art. An IE of an existing RRC message is expanded to carry the query instruction information, or the RRC message may also be different from any existing RRC message in the prior art.

For another example, specifically, the query instruction information may also be carried through adding a new MAC CE message.

In an optional implementation manner of this embodiment, in 103, the UE may specifically send the movement information to the access network device through upper-layer signaling.

For example, specifically, the movement information may be carried through an IE in an RRC message, where the RRC message may be an RRC message in the prior art, for example, an RRC connection setup complete message, or an RRC message carrying another measurement report of an existing UE (for example, a measurement report message), which is not limited by the embodiment. An IE of an existing RRC message is expanded to carry the movement information, or the RRC message may also be different from any existing RRC message in the prior art.

For another example, specifically, the movement information may also be carried through adding a new MAC CE message.

In an optional implementation manner of this embodiment, after 103, during handover of the UE, the access network device may further send the movement information to a target access network device of the handover, so that the target access network device executes a movement-related operation according to the movement information. By taking an LTE system as an example, an eNB may specifically send the movement information to a target eNB of the handover directly through an X2 interface. Alternatively, the eNB may send the movement information to a target eNB of the handover through an S1 interface via a mobility management entity (MME for short).

In this embodiment, a UE measures a characteristic parameter of a cell to be measured, and then obtains movement information of the UE according to a change of the characteristic parameter within a predetermined time, so that the UE can send the movement information to an access network device and the access network device executes a movement-related operation according to the movement information, which can solve a problem of an increase of a signaling overhead caused by UE speed estimation based on location information reported by a UE in the prior art, so as to further reduce the signaling overhead.

Figure 2:
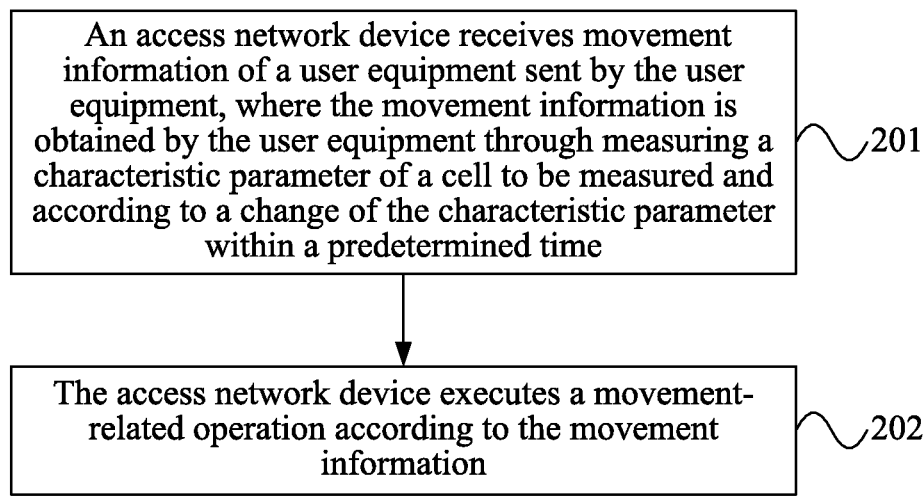
FIG. 2 is a schematic flow chart of a movement information processing method provided in another embodiment of the present invention.

FIG. 2 is a schematic flow chart of a movement information processing method provided in another embodiment of the present invention, and as shown in FIG. 2, the movement information processing method in this embodiment may include the following steps.

201. An access network device receives movement information of a user equipment sent by the user equipment, where the movement information is obtained by the user equipment through measuring a characteristic parameter of a cell to be measured and according to a change of the characteristic parameter within a predetermined time.

The characteristic parameter to be measured may include, but is not limited to, at least one of the following: RSRP, RSRQ, an SNR, an SINR, path loss, a location parameter (for example, GPS information or an OTDOA, which is not limited by the embodiment), a DS of a downlink received signal, and a CQI.

In an optional implementation manner of this embodiment, the UE may specifically calculate the movement information of the UE according to a change amount of the characteristic parameter within a time T. For detailed description, reference may be made to relevant content in the embodiment corresponding to FIG. 1, and details are not repeatedly described here.

It should be noted that the movement information may be the change amount of the characteristic parameter, and the change amount of the characteristic parameter may also be mapped into movement information, for example, according to a mapping table which is of a change amount of a characteristic parameter and movement information and is obtained in advance.

202. The access network device executes a movement-related operation according to the movement information.

Specifically, the access network device may specifically decide a state (an idle state or a connected state) of the UE in combination with whether there is data being transmitted on the UE, or configure a measurement parameter for the UE in combination with network topology information, which is not limited by the embodiment.

In an optional implementation manner of this embodiment, before 201, the access network device may further send configuration information to the user equipment, where the configuration information includes at least one of the following: measurement period information of a measurement characteristic parameter, identity information of a cell to be measured, sending period information for sending movement information, a triggering condition for sending movement information, and a characteristic parameter to be measured.

It should be noted that the cell to be measured may include, but is not limited to, at least one of a service cell and a neighboring cell, which is not limited by the embodiment. The identity information of a cell to be measured may include, but is not limited to, frequency information or a Cell ID of the cell to be measured, which is not limited by the embodiment.

It should be noted that the triggering condition for sending movement information may include, but is not limited to, at least one of the following: a threshold of the characteristic parameter, a hysteresis time, a triggering event, and a threshold of the number of sending times, which is not limited by the embodiment.

For example, when a change of the characteristic parameter within a predetermined time reaches a configured threshold of the characteristic parameter (for example, greater than or equal to the threshold, or smaller than or equal to the threshold, or between two thresholds, which is not limited by the embodiment), the UE may trigger reporting of movement information, that is, the UE sends the movement information to the access network device.

For another example, when a change of the characteristic parameter within a predetermined time reaches a configured threshold of the characteristic parameter and a specific hysteresis time T is reached, the UE may trigger reporting of movement information, that is, the UE sends the movement information to the access network device.

For another example, when a change of the characteristic parameter within a predetermined time reaches a configured threshold N consecutive times, the UE may trigger reporting of movement information, that is, the UE sends the movement information to the access network device.

For another example, when the number of sending times reaches a configured threshold of the number of sending times, the UE may no longer trigger reporting of movement information, that is, the UE no longer sends the movement information to the access network device.

In an optional implementation manner of this embodiment, the access network device may specifically send the configuration information to the user equipment through a broadcast message or upper-layer signaling. For detailed description, reference may be made to relevant content in the embodiment corresponding to FIG. 1, and details are not repeatedly described here.

For example, for upper-layer signaling, specifically, the configuration information may be carried through an IE in an RRC message, where the RRC message may be an RRC message in the prior art, for example, an RRC connection reconfiguration message, which is not limited by the embodiment. An IE of an existing RRC message is expanded to carry the configuration information, or the RRC message may also be different from any existing RRC message in the prior art.

For another example, for upper-layer signaling, specifically, the configuration information may also be carried through adding a new MAC CE message.

In an optional implementation manner of this embodiment, the access network device may also not send configuration information to the user equipment, but the UE obtains the configuration information according to a preconfiguration, for example, a protocol agreement.

In an optional implementation manner of this embodiment, before 201, the access network device may further send query instruction information to the user equipment, where the query instruction information is used to query the movement information of the user equipment. Specifically, the access network device may send the query instruction information to the UE through upper-layer signaling.

For example, specifically, an IE in an RRC message may carry the query instruction information, where the RRC message may be an RRC message in the prior art. An IE of an existing RRC message is expanded to carry the query instruction information, or the RRC message may also be different from any existing RRC message in the prior art.

For another example, specifically, the query instruction information may also be carried through adding a new MAC CE message.

In an optional implementation manner of this embodiment, in 201, the access network device may specifically receive the movement information of the user equipment sent, through upper-layer signaling, by the user equipment.

For example, specifically, the movement information may be carried through an IE in an RRC message, where the RRC message may be an RRC message in the prior art, for example, an RRC connection setup complete message, or an RRC message carrying another measurement report of an existing UE (for example, a measurement report message), which is not limited by the embodiment. An IE of an existing RRC message is expanded to carry the movement information, or the RRC message may also be different from any existing RRC message in the prior art.

For another example, specifically, the movement information may also be carried through adding a new MAC CE message.

In an optional implementation manner of this embodiment, after 201, during handover of the user equipment, the access network device may further send the movement information to a target access network device of the handover, so that the target access network device executes a movement-related operation according to the movement information. By taking an LTE system as an example, an eNB may specifically send the movement information to a target eNB of the handover directly through an X2 interface. Alternatively, the eNB may send the movement information to a target eNB of the handover through an S1 interface via an MME.

In this embodiment, an access network device receives movement information of a user equipment sent by the user equipment, where the movement information is obtained by the user equipment through measuring a characteristic parameter of a cell to be measured and according to a change of the characteristic parameter within a predetermined time, so that the access network device can execute a movement-related operation according to the movement information, which can solve a problem of an increase of a signaling overhead caused by UE speed estimation based on location information reported by a UE in the prior art, so as to further reduce the signaling overhead.

It should be noted that, for ease of description, the foregoing method embodiments are described as a combination of a series of actions. However, persons skilled in the art should know that, the present invention is not limited by the described action sequence, because according to the present invention, some steps may be performed in another sequence or simultaneously. Next, persons skilled in the art should also know that, all the embodiments described in the specification are exemplary embodiments, and the involved actions and modules are not essential in the present invention.

In the foregoing embodiments, description of each embodiment has its own emphasis, and for a part that is not detailed in an embodiment, reference may be made to relevant description of another embodiment.

Figure 3:
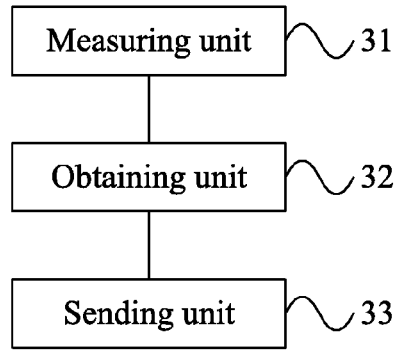
FIG. 3 is a schematic structural diagram of a user equipment provided in another embodiment of the present invention.

FIG. 3 is a schematic structural diagram of a user equipment provided in another embodiment of the present invention. As shown in FIG. 3, the user equipment in this embodiment may include a measuring unit 31, an obtaining unit 32, and a sending unit 33. The measuring unit 31 is configured to measure a characteristic parameter of a cell to be measured. The obtaining unit 32 is configured to obtain movement information of the user equipment according to a change of the characteristic parameter within a predetermined time. The sending unit 33 is configured to send the movement information to an access network device, so that the access network device executes a movement-related operation according to the movement information.

The characteristic parameter to be measured may include, but is not limited to, at least one of the following: RSRP, RSRQ, an SNR, an SINR, path loss, a location parameter (for example, GPS information or an OTDOA, which is not limited by the embodiment), a DS of a downlink received signal, and a CQI.

In an optional implementation manner of this embodiment, the obtaining unit 32 may specifically calculate the movement information of the user equipment according to a change amount of the characteristic parameter within a time T.

It should be noted that the movement information may be the change amount of the characteristic parameter, and the change amount of the characteristic parameter may also be mapped into movement information, for example, according to a mapping table which is of a change amount of a characteristic parameter and movement information and is obtained in advance.

Specifically, the access network device may decide a state (an idle state or a connected state) of the user equipment in combination with whether there is data being transmitted on the user equipment, or configure a measurement parameter for the user equipment in combination with network topology information, which is not limited by the embodiment.

Figure 4:
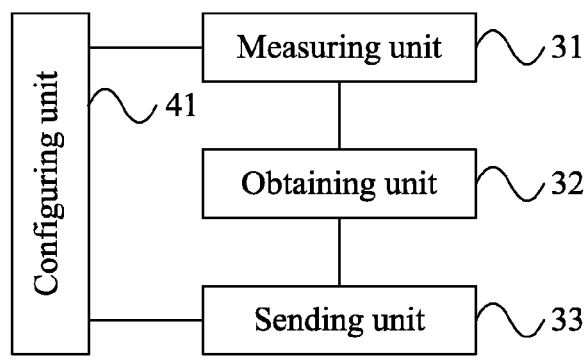
FIG. 4 is a schematic structural diagram of a user equipment provided in another embodiment of the present invention.

In an optional implementation manner of this embodiment, as shown in FIG. 4, the user equipment in this embodiment may further include a configuring unit 41, configured to receive configuration information sent by the access network device, where the configuration information includes at least one of the following: measurement period information of a measurement characteristic parameter, identity information of a cell to be measured, sending period information for sending movement information, a triggering condition for sending movement information, and a characteristic parameter to be measured.

It should be noted that the cell to be measured may include, but is not limited to, at least one of a service cell and a neighboring cell, which is not limited by the embodiment. The identity information of a cell to be measured may include, but is not limited to, frequency information or a Cell ID of the cell to be measured, which is not limited by the embodiment.

It should be noted that the triggering condition for sending movement information may include, but is not limited to, at least one of the following: a threshold of the characteristic parameter, a hysteresis time, a triggering event, and a threshold of the number of sending times, which is not limited by the embodiment.

In an optional implementation manner of this embodiment, the configuring unit 41 may specifically receive configuration information sent, through a broadcast message or upper-layer signaling, by the access network device.

For example, for upper-layer signaling, specifically, the configuration information may be carried through an IE in an RRC message, where the RRC message may be an RRC message in the prior art, for example, an RRC connection reconfiguration message, which is not limited by the embodiment. An IE of an existing RRC message is expanded to carry the configuration information, or the RRC message may also be different from any existing RRC message in the prior art.

For another example, for upper-layer signaling, specifically, the configuration information may also be carried through adding a new MAC CE message.

In an optional implementation manner of this embodiment, the user equipment may also obtain the configuration information according to a preconfiguration, for example, a protocol agreement.

Figure 5:
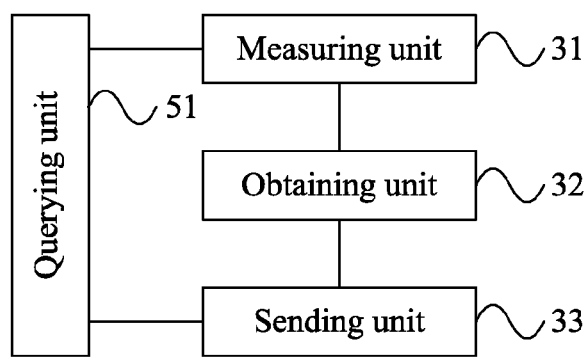
FIG. 5 is a schematic structural diagram of a user equipment provided in another embodiment of the present invention.

In an optional implementation manner of this embodiment, as shown in FIG. 5, the user equipment in this embodiment may further include a querying unit 51, configured to receive query instruction information sent by the access network device, where the query instruction information is used to query the movement information of the user equipment. Specifically, the querying unit 51 may specifically receive the query instruction information sent, through upper-layer signaling, by the access network device.

For example, specifically, an IE in an RRC message may carry the query instruction information, where the RRC message may be an RRC message in the prior art. An IE of an existing RRC message is expanded to carry the query instruction information, or the RRC message may also be different from any existing RRC message in the prior art.

For another example, specifically, the query instruction information may also be carried through adding a new MAC CE message.

In an optional implementation manner of this embodiment, the sending unit 33 may specifically send the movement information to the access network device through upper-layer signaling.

For example, specifically, the movement information may be carried through an IE in an RRC message, where the RRC message may be an RRC message in the prior art, for example, an RRC connection setup complete message, or an RRC message carrying another measurement report of an existing user equipment (for example, a measurement report message), which is not limited by the embodiment. An IE of an existing RRC message is expanded to carry the movement information, or the RRC message may also be different from any existing RRC message in the prior art.

For another example, specifically, the movement information may also be carried through adding a new MAC CE message.

In this embodiment, a user equipment measures, through a measuring unit, a characteristic parameter of a cell to be measured, and then an obtaining unit obtains movement information of the user equipment according to a change of the characteristic parameter within a predetermined time, so that a sending unit can send the movement information to an access network device and the access network device executes a movement-related operation according to the movement information, which can solve a problem of an increase of a signaling overhead caused by user equipment speed estimation based on location information reported by a user equipment in the prior art, so as to further reduce the signaling overhead.

Figure 6:
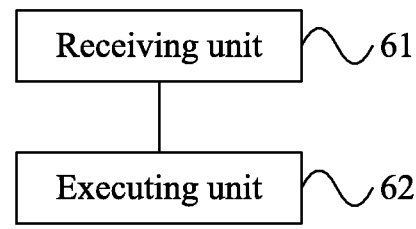
FIG. 6 is a schematic structural diagram of an access network device provided in another embodiment of the present invention.

FIG. 6 is a schematic structural diagram of an access network device provided in another embodiment of the present invention, and as shown in FIG. 6, an access network device in this embodiment may include a receiving unit 61 and an executing unit 62. The receiving unit 61 is configured to receive movement information of a user equipment sent by the user equipment, where the movement information is obtained by the user equipment through measuring a characteristic parameter of a cell to be measured and according to a change of the characteristic parameter within a predetermined time. The executing unit 62 is configured to execute a movement-related operation according to the movement information.

The characteristic parameter to be measured may include, but is not limited to, at least one of the following: RSRP, RSRQ, an SNR, an SINR, path loss, a location parameter (for example, GPS information or an OTDOA, which is not limited by the embodiment), a DS of a downlink received signal, and a CQI.

In an optional implementation manner of this embodiment, the user equipment may specifically calculate the movement information of the user equipment according to a change amount of the characteristic parameter within a time T.

It should be noted that the movement information may be the change amount of the characteristic parameter, and the change amount of the characteristic parameter may also be mapped into movement information, for example, according to a mapping table which is of a change amount of a characteristic parameter and movement information and is obtained in advance.

Specifically, the executing unit 62 may specifically decide a state (an idle state or a connected state) of the user equipment in combination with whether there is data being transmitted on the user equipment, or configure a measurement parameter for the user equipment in combination with network topology information, which is not limited by the embodiment.

Figure 7:
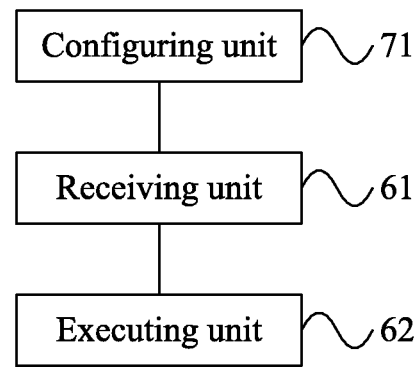
FIG. 7 is a schematic structural diagram of an access network device provided in another embodiment of the present invention.

In an optional implementation manner of this embodiment, as shown in FIG. 7, the access network device in this embodiment may further include, where the access network device further includes a configuring unit 71, configured to send configuration information to the user equipment, where the configuration information includes at least one of the following: measurement period information of a measurement characteristic parameter, identity information of a cell to be measured, sending period information for sending movement information, a triggering condition for sending movement information, and a characteristic parameter to be measured.

It should be noted that the cell to be measured may include, but is not limited to, at least one of a service cell and a neighboring cell, which is not limited by the embodiment. The identity information of a cell to be measured may include, but is not limited to, frequency information or a Cell ID of the cell to be measured, which is not limited by the embodiment.

It should be noted that the triggering condition for sending movement information may include, but is not limited to, at least one of the following: a threshold of the characteristic parameter, a hysteresis time, a triggering event, and a threshold of the number of sending times, which is not limited by the embodiment.

In an optional implementation manner of this embodiment, the configuring unit 71 may specifically send the configuration information to the user equipment through a broadcast message or upper-layer signaling.

In an optional implementation manner of this embodiment, the access network device may also not send configuration information to the user equipment, but the user equipment obtains the configuration information according to a preconfiguration, for example, a protocol agreement.

Figure 8:
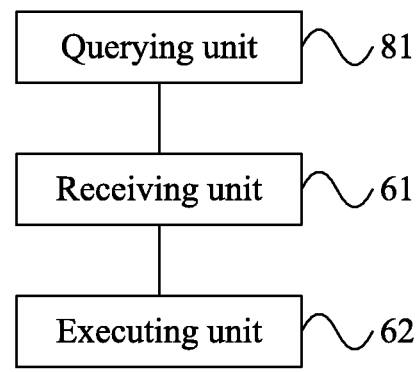
FIG. 8 is a schematic structural diagram of an access network device provided in another embodiment of the present invention.

In an optional implementation manner of this embodiment, as shown in FIG. 8, the access network device in this embodiment may further include a querying unit 81, configured to send query instruction information to the user equipment, where the query instruction information is used to query the movement information of the user equipment. Specifically, the querying unit 81 may send the query instruction information to the user equipment through upper-layer signaling.

For example, specifically, an IE in an RRC message may carry the query instruction information, where the RRC message may be an RRC message in the prior art. An IE of an existing RRC message is expanded to carry the query instruction information, or the RRC message may also be different from any existing RRC message in the prior art.

For another example, specifically, the query instruction information may also be carried through adding a new MAC CE message.

In an optional implementation manner of this embodiment, the receiving unit 61 may specifically receive the movement information of the user equipment sent, through upper-layer signaling, by the user equipment.

For example, specifically, the movement information may be carried through an IE in an RRC message, where the RRC message may be an RRC message in the prior art, for example, an RRC connection setup complete message, or an RRC message carrying another measurement report of an existing user equipment (for example, a measurement report message), which is not limited by the embodiment. An IE of an existing RRC message is expanded to carry the movement information, or the RRC message may also be different from any existing RRC message in the prior art.

For another example, specifically, the movement information may also be carried through adding a new MAC CE message.

Figure 9:
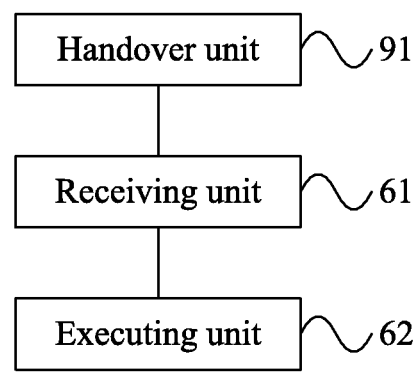
FIG. 9 is a schematic structural diagram of an access network device provided in another embodiment of the present invention.

In an optional implementation manner of this embodiment, as shown in FIG. 9, the access network device in this embodiment may further include a handover unit 91, configured to, during handover of the user equipment, send the movement information to a target access network device of the handover, so that the target access network device executes a movement-related operation according to the movement information. By taking an LTE system as an example, the handover unit 91 may specifically send the movement information to a target eNB of the handover directly through an X2 interface. Alternatively, the handover unit 91 may send the movement information to a target eNB of the handover through an S1 interface via an MME.

In this embodiment, an access network device receives, through a receiving unit, movement information of a user equipment sent by the user equipment, where the movement information is obtained by the user equipment through measuring a characteristic parameter of a cell to be measured and according to a change of the characteristic parameter within a predetermined time, so that an executing unit can execute a movement-related operation according to the movement information, which can solve a problem of an increase of a signaling overhead caused by user equipment speed estimation based on location information reported by a user equipment in the prior art, so as to further reduce the signaling overhead.

Another embodiment of the present invention provides a movement information processing system, including the user equipment provided by any one of the embodiments corresponding to FIG. 3 to FIG. 5 and the access network device provided by any one of the embodiments corresponding to the FIG. 6 to FIG. 9. For detailed description of the user equipment, reference may be made to relevant content in the embodiments corresponding to FIG. 3 to FIG. 5; for detailed description of the access network device, reference may be made to relevant content in the embodiments corresponding to FIG. 6 to FIG. 9, and details are not repeatedly described here.

Persons skilled in the art may clearly understand that, for the purpose of convenient and brief description, for a detailed working process of the foregoing system, apparatus, and unit, reference may be made to the corresponding process in the foregoing method embodiments, and details are not repeatedly described here.

In the several embodiments provided in the present application, it should be understood that the disclosed system, apparatus, and method may be implemented in other manners. For example, the described apparatus embodiment is merely exemplary. For example, dividing of the units is merely a kind of logical function dividing and there may be other dividing manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts shown as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may also be implemented in a form of hardware plus a software functional module.

The integrated unit implemented in a form of a software functional unit may be stored in a computer readable storage medium. The software functional unit is stored in a storage medium, and includes several instructions used to instruct a computer device (which may be a personal computer, a server, or a network device, or the like) to perform part of the steps of the methods according to the embodiments of the present invention. The foregoing storage medium includes any medium that is capable of storing program codes, such as a USB flash disk, a removable hard disk, a read-only memory (ROM for short), a random access memory (RAM for short), a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features of the technical solutions described in the foregoing embodiments; however, these modifications or replacements do not make the essence of the corresponding technical solutions depart from the spirit and scope of the technical solutions of the embodiments of the present invention.

What is claimed is:

1. A movement information processing method, the method comprising:
    measuring, by a user equipment, a characteristic parameter of a single cell to be measured, wherein the characteristic parameter is a characteristic of a transmission of a signal of the single cell that is received at the user equipment;
    obtaining, by the user equipment, movement information of the user equipment according to a change of the characteristic parameter within a predetermined time, wherein the change of the characteristic parameter is a change in the characteristic of the transmission of the signal of the single cell that is received at the user equipment; and
    sending, by the user equipment, the movement information to an access network device, so that the access network device executes a movement-related operation according to the movement information, wherein the movement-related operation is at least one of determining, in combination with whether data being transmitted by the user equipment, that a user equipment state is a one of an idle state or a connected state, or configuring a measurement parameter for the user equipment in combination with network topology information.

2. The method according to claim 1, the method further comprising receiving, by the user equipment and before measuring the characteristic parameter of the single cell to be measured, configuration information sent by the access network device, wherein the configuration information comprises at least one of the following: measurement period information of a measurement characteristic parameter, identity information of a cell to be measured, sending period information for sending movement information, a triggering condition for sending movement information, or a characteristic parameter to be measured.

3. The method according to claim 1, further comprising receiving, by the user equipment, query instruction information sent by the access network device, wherein the query instruction information is used to query the movement information of the user equipment.

4. The method according to claim 1, wherein the method further comprises sending, by the access network device during a handover of the user equipment and after sending the movement information to an access network device, the movement information to a target access network device of the handover, so that the target access network device executes a movement-related operation according to the movement information.

5. The method according to claim 1, wherein the characteristic parameter of the single cell to be measured comprises at least one of a reference signal received power, a reference signal received quality, a signal to noise ratio, a signal to interference plus noise ratio, a path loss, a Doppler shift of a downlink received signal, or a channel quality indication.

6. The method according to claim 1, wherein the sending the movement information by the user equipment to the access network device is performed in response to a triggering condition, wherein the triggering condition is a relation of the movement information to a threshold.

7. A movement information processing method, the method comprising:
receiving, by an access network device, movement information of a user equipment sent by the user equipment, wherein the movement information is obtained by the user equipment by measuring a characteristic parameter of a single cell to be measured and according to a change of the characteristic parameter within a predetermined time, wherein the characteristic parameter is a characteristic of a transmission of a signal of the single cell to be measured that is received at the user equipment, and wherein the change of the characteristic parameter is a change in the characteristic of the transmission of the signal of the single cell to be measured that is received at the user equipment; and
executing, by the access network device, a movement-related operation according to the movement information, wherein the movement-related operation is at least one of determining, in combination with whether data being transmitted by the user equipment, that a user equipment state is a one of an idle state or a connected state, or configuring a measurement parameter for the user equipment in combination with network topology information.

8. The method according to claim 7, wherein the method further comprises sending, by the access network device before receiving the movement information of the user equipment, configuration information to the user equipment, wherein the configuration information comprises at least one of measurement period information of a measurement characteristic parameter, identity information of the single cell to be measured, sending period information for sending movement information, a triggering condition for sending movement information, or a characteristic parameter to be measured.

9. The method according to claim 7, wherein the method further comprises sending, by the access network device before receiving the movement information of the user equipment, query instruction information to the user equipment, wherein the query instruction information is used to query the movement information of the user equipment.

10. The method according to claim 9, wherein the method further comprises sending, by the access network device during a handover of the user equipment, and after receiving the movement information of the user equipment, the movement information to a target access network device of the handover, so that the target access network device executes a movement-related operation according to the movement information.

11. The method according to claim 9, wherein the characteristic parameter to be measured comprises at least one of a reference signal received power, a reference signal received quality, a signal to noise ratio, a signal to interference plus noise ratio, path loss, a Doppler shift of a downlink received signal, or a channel quality indication.

12. A user equipment, comprising:
a measuring unit, configured to measure a characteristic parameter of a single cell to be measured, wherein the characteristic parameter is a characteristic of a transmission of a signal of the single cell that is received at the user equipment;
an obtaining unit, configured to obtain movement information of the user equipment according to a change of the characteristic parameter within a predetermined time, wherein the change of the characteristic parameter is a change in the characteristic of the transmission of the signal of the single cell that is received at the user equipment; and
a sending unit, configured to send the movement information to an access network device, so that the access network device executes a movement-related operation according to the movement information, wherein the movement-related operation is at least one of determining, in combination with whether data being transmitted by the user equipment, that a user equipment state is a one of an idle state or a connected state, or configuring a measurement parameter for the user equipment in combination with network topology information.

13. The user equipment according to claim 12, wherein the user equipment further comprises a configuring unit, configured to receive configuration information sent by the access network device, wherein the configuration information comprises at least one of a measurement period information of a measurement characteristic parameter, identity information of the single cell to be measured, sending period information for sending movement information, a triggering condition for sending movement information, or a characteristic parameter to be measured.

14. The user equipment according to claim 12, wherein the user equipment further comprises a querying unit, configured to receive query instruction information sent by the access network device, wherein the query instruction information is used to query the movement information of the user equipment.

15. The user equipment according to claim 12, wherein the characteristic parameter to be measured comprises at least one of a reference signal received power, a reference signal received quality, a signal to noise ratio, a signal to interference plus noise ratio, a path loss, a Doppler shift of a downlink received signal, or a channel quality indication.

16. An access network device, comprising:
a receiving unit, configured to receive movement information of a user equipment sent by the user equipment, wherein the movement information is obtained by the user equipment through measuring a characteristic parameter of a single cell to be measured and according to a change of the characteristic parameter within a predetermined time, wherein the characteristic parameter is a characteristic of a transmission of a signal of the single cell to be measured that is received at the user equipment, and wherein the change of the characteristic parameter is a change in the characteristic of the transmission of the signal of the single cell to be measured that is received at the user equipment; and
an executing unit, configured to execute a movement-related operation according to the movement information, wherein the movement-related operation is at least one of determining, in combination with whether data being transmitted by the user equipment, that a user equipment state is a one of an idle state or a connected state, or configuring a measurement parameter for the user equipment in combination with network topology information.

17. The access network device according to claim 16, wherein the access network device further comprises a configuring unit, configured to send configuration information to the user equipment, wherein the configuration information comprises at least one of measurement period information of a measurement characteristic parameter, identity information of the single cell to be measured, sending period information for sending movement information, a triggering condition for sending movement information, or a characteristic parameter to be measured.

18. The access network device according to claim 16, wherein the access network device further comprises a querying unit, configured to send query instruction information to the user equipment, wherein the query instruction information is used to query the movement information of the user equipment.

19. The access network device according to claim 16, wherein the access network device further comprises a handover unit, configured to, during a handover of the user equipment, send the movement information to a target access network device of the handover, so that the target access network device executes a movement-related operation according to the movement information.

20. The access network device according to claim 16, wherein the characteristic parameter to be measured comprises at least one of a reference signal received power, a reference signal received quality, a signal to noise ratio, a signal to interference plus noise ratio, path loss, a Doppler shift of a downlink received signal, or a channel quality indication.

* * * * *